No. 743,778. Patented November 10, 1903.

UNITED STATES PATENT OFFICE.

JOSEPH TURNER, OF HUDDERSFIELD, ENGLAND.

YELLOW DYE AND PROCESS OF MAKING SAME.

SPECIFICATION forming part of Letters Patent No. 743,778, dated November 10, 1903.

Application filed April 10, 1903. Serial No. 152,068. (Specimens.)

*To all whom it may concern:*

Be it known that I, JOSEPH TURNER, a subject of the King of Great Britain, residing at Huddersfield, in the county of York, England, have invented certain new and useful Improvements in the Manufacture of a Yellow Dyestuff; and I do hereby declare the following to be a full, clear, and exact description of the invention, such as will enable others skilled in the art to which it appertains to make and use the same.

This invention relates to the manufacture or production of a yellow dyestuff for dyeing fiber or fabrics.

The object of my invention is to produce a new and novel yellow dyestuff capable of dyeing wool, silk, and jute in fine greenish-yellow shades which are fast to light.

In the course of investigation I have found that meta dinitro diphenylamin para sulfonic acid when nitrated under suitable conditions yields a new yellow dyestuff capable of dyeing wool, silk, and jute in fine greenish-yellow shades fast to light.

For the nitration of meta dinitro diphenylamin para sulfonic acid according to my invention I take one hundred parts, by weight, of the above-mentioned dinitro diphenylamin sulfo-acid and dissolve same in one hundred and fifty parts of water, adding fifty parts of nitric acid. The mixture is then raised to a suitable temperature—say 80° centigrade—and maintained at from 80° to 90° centigrade for about one hour. The end of the reaction is indicated by the dyestuff becoming partially precipitated. The coloring-matter is separated by diluting with an equal bulk of water and adding common salt. After filtering the precipitate is washed with salt water, pressed, and dried.

I do not limit myself to the precise details or proportions of parts given in the foregoing example, as by employing, for instance, a relatively larger quantity of nitric acid and a lower temperature a similar result will be obtained.

The dyestuff produced according to my invention shows the following characteristics: a bright-yellow powder easily soluble in hot water, from which it crystallizes in golden-yellow spangles on cooling. It possesses great penetrative power and dyes perfectly level from boiling baths. It is fast against the action of light and is soluble in sulfuric acid, with an orange-yellow color.

What I claim, and desire to secure by Letters Patent of the United States, is—

1. A dyestuff consisting of a bright-yellow powder which is soluble in water and which is derived by combining meta dinitro diphenylamin para sulfonic acid with nitric acid.

2. The method of forming a yellow dyestuff, which consists in treating an aqueous solution of meta dinitro diphenylamin para sulfonic acid with nitric acid.

3. The method of forming a yellow dyestuff, which consists in treating an aqueous solution of meta dinitro diphenylamin para sulfonic acid with nitric acid, then heating the mixture, and treating it with additional water and salt.

In testimony whereof I affix my signature in presence of two witnesses.

JOSEPH TURNER.

Witnesses:
HERBERT HANSON,
THOMAS H. BARRON.